United States Patent
Chou et al.

(10) Patent No.: US 9,098,862 B2
(45) Date of Patent: *Aug. 4, 2015

(54) SYSTEMS AND METHODS FOR QUERY INPUT VIA TELEPHONY DEVICES

(71) Applicant: Amazon Technologies, Inc., Reno, NV (US)

(72) Inventors: Eric Chunyi Chou, Issaquah, WA (US); Mark N. Kelly, Seattle, WA (US); Ben L. Kirkpatrick, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/468,096

(22) Filed: Aug. 25, 2014

(65) Prior Publication Data

US 2015/0051952 A1 Feb. 19, 2015

Related U.S. Application Data

(63) Continuation of application No. 12/823,974, filed on Jun. 25, 2010, now Pat. No. 8,817,969.

(51) Int. Cl.
*H04M 5/00* (2006.01)
*G06Q 30/02* (2012.01)
*H04M 3/00* (2006.01)

(52) U.S. Cl.
CPC ............ *G06Q 30/0203* (2013.01); *H04M 3/00* (2013.01)

(58) Field of Classification Search
USPC ............. 379/265.02, 266.07, 266.08, 201.01, 379/201.02, 201.12, 204.01; 705/7.32
See application file for complete search history.

(56) References Cited

U.S. PATENT DOCUMENTS

| | | | |
|---|---|---|---|
| 5,206,903 A | 4/1993 | Kohler et al. | |
| 6,093,026 A | 7/2000 | Walker et al. | |
| 8,155,297 B1 | 4/2012 | Dhir et al. | |
| 8,817,969 B1 | 8/2014 | Chou et al. | |
| 2004/0093261 A1 | 5/2004 | Jain et al. | |
| 2004/0252816 A1 | 12/2004 | Nicolas | |
| 2010/0074421 A1 | 3/2010 | Anderson | |
| 2010/0241573 A1* | 9/2010 | Joa et al. | 705/80 |
| 2010/0324971 A1 | 12/2010 | Morsberger | |
| 2011/0137709 A1 | 6/2011 | Meyer et al. | |
| 2011/0270687 A1 | 11/2011 | Bazaz | |

* cited by examiner

*Primary Examiner* — Olisa Anwah
(74) *Attorney, Agent, or Firm* — Knobbe Martens Olson & Bear LLP

(57) ABSTRACT

Providers of goods and services may desire human input regarding the products that they offer. A vocal query service provides a mechanism to present queries to human respondents. A human respondent may be presented with information and subsequently queried as to their opinion. The respondents receiving the query may be selected based upon profiles containing demographic information, interest information, desired contact time, and the like. Prospective respondents may be contacted via a personal telephone at a time of their choosing and may choose whether or not to respond. During the query, should a respondent require assistance, the respondent may be contact a customer service agent. Query respondents may be motivated to participate, as the query is designed to appeal to respondent's interest and is presented at a convenient time. The query service may also increase the customer service agents to expand the query to additional human respondents in near-real time.

20 Claims, 6 Drawing Sheets

SYSTEMS AND METHODS FOR QUERY INPUT VIA TELEPHONY DEVICES

RELATED APPLICATIONS

Incorporation by Reference to any Priority Applications

Any and all applications for which a foreign or domestic priority claim is identified in the Application Data Sheet as filed with the present application are incorporated by reference under 37 CFR 1.57 and made a part of this specification.

BACKGROUND

Organizations that conduct transactions with customers (e.g., businesses, non-profit organizations, government agencies, etc.) often seek to distinguish themselves by obtaining information regarding the markets they serve. For example, in order to identify upcoming trends, allocate resources, raise customer awareness of the organization, and gauge customer sentiment, organizations may solicit customer opinions regarding selected aspects of the organization's area of operations. To obtain customer opinions, organizations may commission customer surveys.

However, quickly obtaining reliable survey results may be expensive, time consuming, and difficult. In one example, prospective respondents may not be interested in responding to a survey, resulting in depressed response rates and/or inaccurate responses. In another example, surveys may be difficult to conduct quickly, as it is challenging to contact a large number of respondents in a short period of time. As a result, it may be challenging for organizations to quickly obtain reliable customer opinions.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
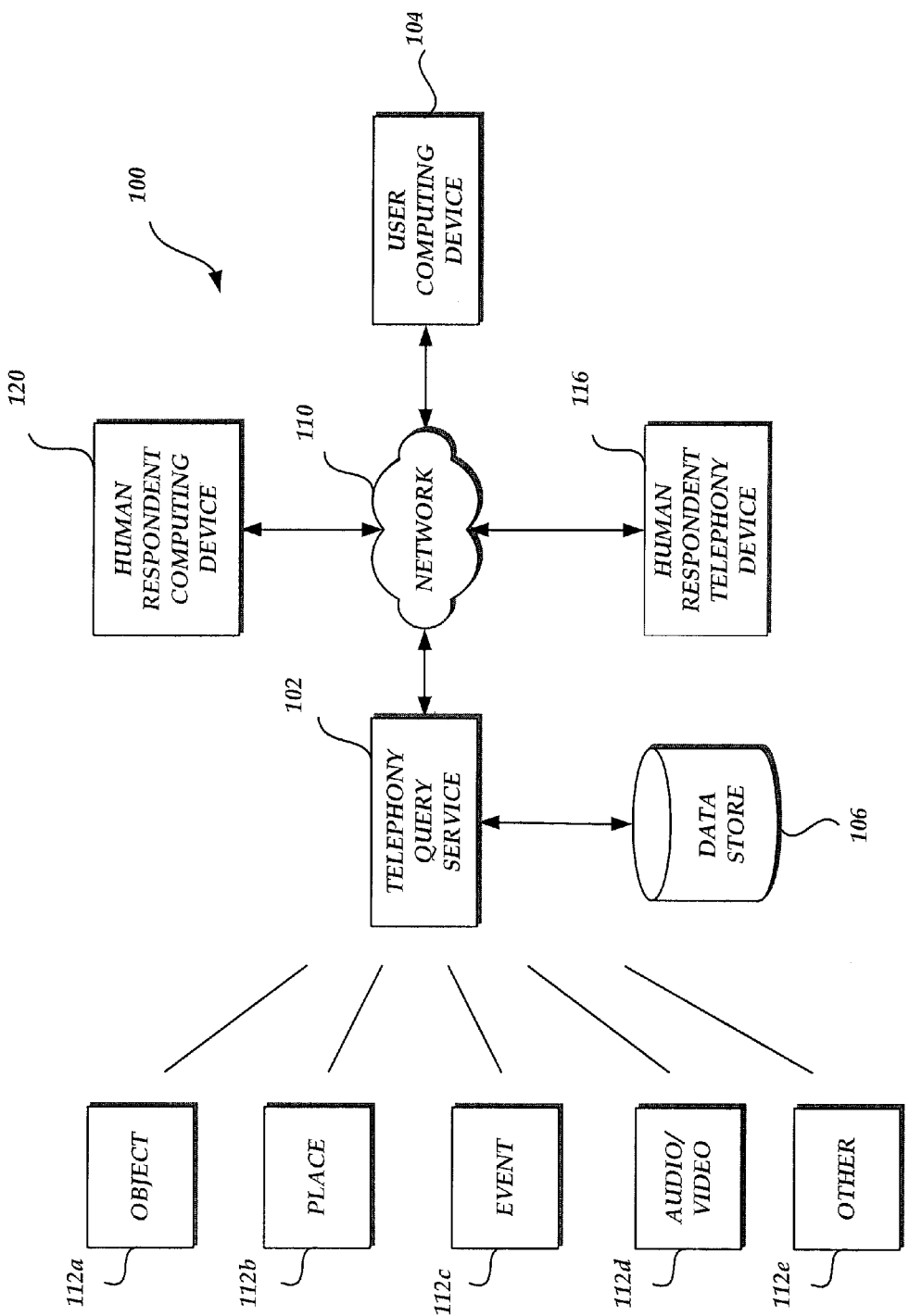
FIG. 1 is a schematic block diagram depicting an illustrative operating environment in which a telephony query service provides human input regarding an item of interest in response to query information submitted to the telephony query service.

Generally described, embodiments of the present disclosure relate to providing human input (e.g., opinions) regarding an item of interest to a user and storing the human input for subsequent recall and use by the user or others. The user may be any individual or organization which desires human input regarding their activities. Examples may include, but are not limited to, non-profit organizations (e.g., charities, political organizations, politicians), producers of goods and/or services (manufacturers, music companies, etc.), organizations which disseminate or gather information on behalf of other organizations or individuals (e.g., advertisers, survey gatherers), and the like.

In this regard, a telephony query service is described that obtains human input regarding the item of interest on behalf of the user. The telephony query service contacts human respondents at a telephony device (e.g., a mobile phone) of the respondent, presents the respondent with queries regarding the item of interest, and stores responses received from the respondent. The stored responses may be further provided to the user as needed. As discussed in greater detail below, the human respondents are selected to receive queries based, in part, upon a prior registration with the telephone query service. Thus, the contact with the human respondents is not an uninvited solicitation, but rather a deliberate choice on the part of the human respondent.

The item of interest may be anything a person can see, hear, imagine, think about, or touch. In certain embodiments, the item of interest may be an object (e.g., an article of manufacture, plant, animal, or person), a place (e.g., a building, park, business, landmark, or address), or an event (e.g., a game, concert, or movie).

The telephony query service may receive query information regarding the item of interest for use in generating the human input. The query information may include information such as characteristics of the respondents desired to participate in the query, information to accompany the query, query questions, and desired number of respondents. The telephony query service may submit the query information to a human interaction task system to obtain human input.

The human interaction task system may process the query information for presentation to the human respondents. For example, relevant portions of the query information (e.g., query questions, information for presentation to human respondents prior to receiving the query questions) may be extracted from the query information. Furthermore, as the query is intended for presentation to respondents employing a telephony device, translation of the query information into formats appropriate to presentation on telephony devices may be necessary. Examples may include text to speech conversion and downscaling of audio and/or video.

The choice of which human respondents receive the query may be made based upon the query information and human respondent profiles. As discussed in greater detail below, human respondents may register with the human interaction task system to participate in queries. During the registration process, the human respondents may provide profile information that describes the human respondent. The profile information may include, but is not limited to, demographic information, interests, availability for participating in queries, telephony contact information, telephony device information, and the like. The query information may specify that prospective human respondents possess one or more selected profile information in order to participate in a query. For example, a time sensitive query may require that a prospective human respondent be available to respond within one hour. In another example, a query regarding a consumer product for teens may require the prospective human respondent be between the ages of thirteen through nineteen.

The query may then be transmitted to human respondents who both possess profile information matching the query information and who have indicated they are available at the time of the incipient transmission. The human respondent may receive one or more prospective queries on their telephony device and review descriptions of the queries to determine whether they are interested in responding to the queries. If so, the human respondent may indicate their willingness to participate in a selected query and agree to the terms of the query (e.g., time limits for completion, confidentiality, etc.). The human respondent may then provide responses to query questions through their telephony device (e.g., spoken response, keypad input). Upon completion of the query, the human respondent may be further provided the opportunity to rate the query experience. In this manner, human respondents only receive prospective queries during a time they have indicated that they are available and only participate in queries which they affirmatively select.

The query responses may be collected by the telephony query service and provided to the user. The user may also be provided the opportunity to rate the human respondents. This mutual rating system may provide the telephony survey service the ability to identify users and human respondents which are rated either above or below average. Above average human respondents may be provided with rewards, as discussed in greater detail below.

In one example, the user may include a music company and the item of interest may be a recording artist. The recording company may desire information regarding the popularity of the recording artist within selected age groups and selected metropolitan areas in order to plan a concert tour for the artist. Therefore, the recording company may submit query information regarding the artist to the telephony query service. In order to obtain responses from respondents within the desired age range and geographic locations, the query information may include a requirement that prospective human respondents be of a selected age range and reside within the selected metropolitan areas. The query information may further include information about the artist, such as at least a portion of one or more songs of the artist. The query information may additionally include questions designed to determine the respondent's interest in the artist. In this manner, interest in the artist within the desired age range and locations may be gauged and those areas having the highest interest level may be selected for concert tour dates.

In another example, the user may be a politician and the item of interest may be perceptions of the politician. The query information may require that prospective respondents reside within a selected geographic region, such as the politician's political district. Respondents may be asked a series of questions before and after receiving additional information. The additional information may include radio campaign advertisements, print campaign advertisements, video campaign advertisements, and the like. By measuring respondent's responses without and with various forms of campaign advertisements, a politician may determine which advertising is best for their campaign.

In a further example, the user could be a customer of a utility company and the item of interest could be a bill from the utility company. Prospective human respondents may be a representative of the utility company. Therefore, the utility customer may submit query information regarding the bill (e.g., specific questions, information identifying the customer, etc.) to the telephony query service. In order to obtain a response from the appropriate representative of the utility company, the telephony query service query information may include a requirement that prospective human respondents be from a specific department, hold specific knowledge (e.g., a selected certification), and the like. The query information may additionally include questions the utility consumer desires to be answered by the utility company. In this manner, a representative of the utility company having a desired knowledge and/or skill set may return responses to the customer's questions in a relatively short time frame.

The telephony query service may further make customer service agents (CSAs) available to speak to human respondents in the event that the human respondents require assistance with their respective queries. The CSAs may be agents affiliated with the user, such as employees or contractors of the user. As discussed in greater detail below, when the human respondent desires communication with a CSA, the human respondent is placed in communication with a call distribution system, such as an automatic call distribution system (ACD) that routes the call over which the query is being conducted to an available CSA. Embodiments of ACDs are described in U.S. patent application Ser. No. 12/192,067, filed Aug. 14, 2008, entitled, "SYSTEM AND METHOD FOR AUTOMATED CALL DISTRIBUTION," Ser. No. 12/390,365, filed Feb. 20, 2009, entitled, "SYSTEM AND METHOD FOR AUTOMATED CALL DISTRIBUTION, and Ser. No. 12/192,064, filed Aug. 14, 2008 and entitled, "INDEPENDENT CUSTOMER SERVICE AGENTS," which are incorporated herein by reference in their entirety. The user may furnish the telephony query service with contact information for CSAs so as to enable the telephony query service to connect human respondents and CSAs in a call. In certain embodiments, a CSA may be contacted by the human respondent at the time the human respondent conducts their query. In other embodiments, a CSA may call the human respondent back at a later date. In further embodiments, queries may be conducted by a CSA.

The telephony query service may also dynamically adjust the number of CSAs available to potentially respond to human respondents participating in queries managed by the telephony query service, as necessary, to meet anticipated and/or current demand for CSAs by human respondents. As discussed in greater detail below, the telephony query system may monitor the number of spare CSAs. If the number of spare CSAs falls below a selected number, the total number of CSAs available to the telephony query system may be increased. Similarly, if the number of spare CSAs rises above a selected number, the number of CSAs available to the telephony query system may be decreased.

With reference to FIG. 1, an illustrative operating environment 100 is shown, including a telephony query service 102 for providing human input regarding an item of interest to a user. The human input may be obtained by the telephony query service 102 in response to query information provided by a user employing a user computing device 104. As described in greater detail below, the telephony query service 102 may further obtain queries from the query information and distribute the queries to selected human respondents who have registered to use the telephony query service 102 from a computing device 120. The respondents may additionally employ telephony devices 116 to receive the query information and transmit respective responses to the telephony query service 102 for storage and later use.

Responses received from human respondents by the telephony query service 102 may be stored in a data store 106. The data store 106 may comprise one or more data storage devices. The data store 106 may be local to the telephony query service 102 or may communicate with the telephony query service 102 through a communication network 110.

The computing devices 104 and 120 may be any computing devices, such as a laptop or tablet computer, personal computer, personal digital assistant (PDA), hybrid PDA/mobile phone, mobile phone, electronic book reader, set-top box, camera, digital media player, and the like. The telephony device 116 may include, but is not limited to, devices such as land-line telephones, mobile telephones, voice-over IP (VOIP) telephone devices, or any of the afore-mentioned computing devices with communication capability.

In one embodiment, the telephony query service 102 communicates with the user computing device 104 via communication network 110, such as the Internet or a communication link. Those skilled in the art will appreciate that the network 110 may be any wired network, wireless network or combination thereof. In addition, the network 110 may be a personal area network, local area network, wide area network, cable network, satellite network, cellular telephone network, or combination thereof. Protocols and components for communicating via the Internet or any of the other afore-mentioned types of communication networks are well known to those skilled in the art of computer communications and thus, need not be described in more detail herein.

It will be recognized that many of the components described below are optional and that embodiments of the environment 100 may or may not combine components. Components need not be distinct or discrete. Components may be reorganized in the environment 100. For example, the telephony query service 102 and user computing device 104 may be represented in a single physical server or computing system containing all of the subsystems described below or, alternatively, may be split into multiple physical servers.

The telephony query service 102 and user computing device 104 may each be embodied in a plurality of components, each executing an instance of the respective telephony query service 102 and user computing device 104. A server or other computing system implementing the telephony query service 102 and user computing device 104 may include a network interface, memory, processing unit, and computer readable medium drive, all of which may communicate with each other by way of a communication bus. The network interface may provide connectivity over the network 110 and/or other networks or computer systems. The processing unit may communicate to and from memory containing program instructions that the processing unit executes in order to operate the telephony query service 102 and user computing device 104. The memory generally includes RAM, ROM, and/or other persistent and/or auxiliary memory.

As noted above, the item of interest to the user may be anything a person can see, hear, imagine, think about or touch. Accordingly, the item of interest may be an object 112a, a place 112b, an event 112c, audio and/or video input 112d or any other human perceptible input 112e. Examples of such other input include, but are not limited to, text input. Accordingly, the data regarding the item of interest may be in the form of visual data (e.g., an image, drawing, text, video, etc.), aural data (e.g., a voice recording, song sample, etc.) or tactile data (e.g., motion capture input, touch pad entries, etc.). Moreover, such data may include or be representative of cognitive data (e.g., thoughts, imagination, etc.). The information regarding the item of interest may be submitted to the telephony query service 102 within the query information (e.g., text) or as a file attached to the query information (e.g., audio/video).

Figure 2:
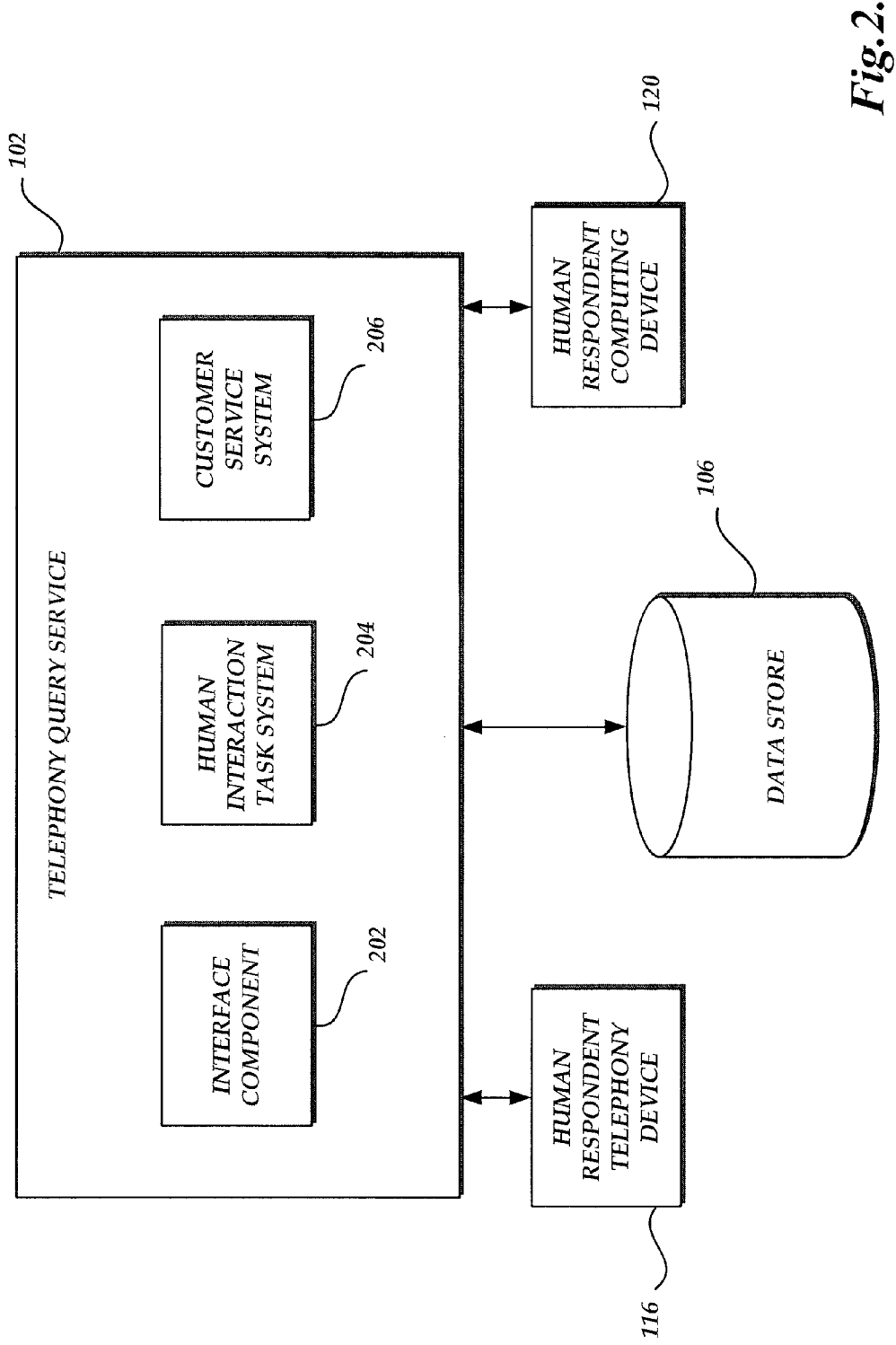
FIG. 2 is a schematic block diagram of certain illustrative components implemented by the telephony query service shown in FIG. 1.

With reference to FIG. 2, illustrative components of the telephony query service 102 for use in providing human input regarding the item of interest to a user will now be addressed. In one embodiment, the telephony query service 102 includes an interface component 202 for receiving profile information from the human respondent computing device 120. The profile information is submitted to a human interaction task system 204 in order for human respondents to receive queries from the telephony query service 102. In further embodiments, the interface component 202 receives query information from the user computing device 104 and submits the query information to the human interaction task system 204. In one embodiment, the interface component 202 generates a query, including query questions, based upon the query information. The query is subsequently submitted to the human interaction task system 204 for processing and distribution to human respondents.

The interface component 202 may generate one or more user interfaces for use by human respondents employing their human respondent computing device 120 for submission of their profile information. As discussed below, human respondent profile information may include any information regarding the human respondent that may be employed by the human interaction task system 204 for identifying queries that are to be provided to the human respondent. Examples of profile information may include, but are not limited to, human respondent interests, human respondent availability to receive queries, human respondent demographics, telephony contact information, and telephony device information.

Human respondent interests may be any information regarding topics which the human respondent finds of interest. Examples may include, but are not limited to, music, sports, games, consumer products, politics, and the like.

Human respondent availability may be the time that the human respondent desires to be available for receiving queries from the telephony query service 102. This time may include time windows (e.g., days of the week, hours of the day). The time may further include duration of time that the query is anticipated to take. For example, a human respondent may indicate an availability window from 12-12:30 each day, reflecting their lunch time.

As discussed in greater detail below, users may also be rated by human respondents based upon the queries which the human respondents receive. As a result, the rating of respective users may also be a criterion employed by human respondents for establishing their availability. In one embodiment, rather than set a time period, a human respondent may indicate that they wish to receive queries provided by users having a rating higher than a first threshold value. In further embodiments, a human respondent may indicate that they wish to automatically accept queries provided by users having a rating higher than a second threshold value. The first and second threshold values may be approximately the same. In additional embodiments, the second threshold value may be higher than the first, reflecting more restrictive condition (e.g., a higher rating) for the human respondent to automatically accept a query as compared to only agreeing to review a prospective query.

In other embodiments discussed in greater detail below, human respondents may also be rated by respective users in response to the query answers they provide. Based upon these responses, human respondents may also be assigned a human respondent rank. Human respondents may indicate in their profile that they are willing to be contacted at any time if the user is seeking a human respondent having their human respondent rank or higher. Therefore, users may include a human respondent rating as a criterion for identifying prospective human respondents to contact.

In alternative embodiments, the human respondent may indicate their availability by employing their telephony device 116 to verify their availability to the telephony query service 102. In certain embodiments, the verification may include calling a selected phone number and entering a personal identification number assigned to the human respondent. Conversely, the human respondent may signal they are not available to receive queries from the telephony query service 102 by calling the selected phone number again and entering their personal identification number. Alternatively, after identifying themselves by entering their personal identification number using their telephony device, the human respondent may provide duration from the time of the call after which they may be deemed unavailable. In either case, by providing availability information, the human respondent may receive queries at a time that is convenient for their schedule.

Human respondent demographics may include, but are not limited to, age, gender, residence location, occupation, income, marital status, education level, products owned, political affiliation, and the like.

Human respondent telephony contact information may include one or more telephone numbers at which the human respondent desires to be reached. Human respondent telephony device information may include the telephony device (s) 116 the human respondent intends to employ when responding to queries from the telephony query service 102. Once the profile information is generated for a human respondent, the interface component 202 may further enable the human respondent to review and update their profile information, as necessary, to maintain accuracy.

Telephony device information may include one or more features of the telephony device corresponding to the provided telephony contact information described above. Examples may include, but are not limited to, media playback capability (e.g., video, music), multimedia messaging service (MMS) capability (e.g., text messaging capability), display capability (e.g., presence of a screen, screen size, screen resolution), operating system executed the telephony device, and other telephony device characteristics known to those of skill in the art.

In further embodiments, human respondents may employ different profiles. For example, a human respondent may specify a first telephony device to be contacted at during daytime hours and a second telephony device to be contacted at during evening hours for receiving queries. In another embodiment, a human respondent may specify different hours of availability on the weekend (e.g., all day) than during the weekday (e.g., 7 pm-10 pm).

The query information may include query criteria, query summary, query language, media, instructions, and minimum number of human respondents. As discussed in greater detail below, the query criteria may be employed by the human interaction task system 204 for selecting human respondents to whom to distribute queries. For example, profile information indicating an age of 30 would satisfy a query criterion of ages from 25 to 50. Query criteria may be further ranked in order of preference such that, should the human interaction task system 204 fail to identify a minimum number of human respondents, a lowest ranked query criteria may be removed so as to increase the likelihood of identifying additional prospective human respondents.

The query summary may include information provided to the human respondent to help the human respondent determine whether to accept the offered query. Examples may include, but are not limited to, a summary of the query (e.g., topic, sample questions, etc.), expected time to complete, and the like.

The query language may specify the queries which are presented to the human respondent. The queries may take any form of question, as known in the art. Examples include, but are not limited to, multiple choice questions, opinion questions where an opinion response is provided on a selected scale (e.g., 1 to 5, 1 to 10, etc.), freeform answer, and the like.

Instructions may specify any instructions which are to be delivered to the human respondent, before, after, or during their consideration of the presented query questions. In one example, the instructions may include instructions regarding proper entry of responses into the telephony device 116 (e.g., speak answer, enter answer on keypad). In another example, the instructions may include informing the human respondent of how they may contact a customer service agent (CSA) for assistance.

In certain embodiments, the human respondent may be asked to respond to query questions based upon their prior knowledge and experiences. However, in other embodiments, the human respondent may be asked to respond to query questions based upon media provided by the query. Thus, the query information may optionally include media for consideration by human respondents. The media may include text, audio (e.g., spoken word, music, sounds, etc.), and video. For example, a human respondent may be asked to listen to an audio advertisement and subsequently respond to a series of queries designed to gauge the respondent's sentiments regarding the product in order to gauge the effectiveness of the audio advertisement.

Minimum number of human respondents may include the number of human respondents from which the user would like to receive responses, at a minimum. Specifying this value recognizes that failing to obtain a minimum number of human respondents may render the response results either statistically unsound or fail to provide the user with sufficient confidence in forming a conclusion from the results. As discussed above, the human interaction task system 204 may modify the query criteria in view of identified prospective human respondents to a query in order to meet or exceed the specified minimum number.

The interface component 202 may further process the query information for use by the human interaction task system 204 in generating queries for human respondents. In one example, the interface component may employ programmed logic to identify the components of the query information and transmit these query information components to the human interaction task system 204. In another embodiment, the interface component 202 may process audio and/or video for playback by telephony devices 116. For example, the format of the audio and/or video may be changed. In another example, the audio and/or video may be compressed so as to occupy less storage space.

Embodiments of the human interaction task system 204 are described in U.S. patent application Ser. No. 12/200,822, filed Aug. 28, 2008, entitled, "ENHANCING AND STORING DATA FOR RECALL AND USE" and Ser. No. 12/200, 822, filed Nov. 20, 2009, entitled "ENHANCING AND STORING DATA FOR RECALL AND USE USING USER FEEDBACK," each of which are incorporated by reference in their entirety. Generally described, the human interaction task system 204 receives profile information and query information from the interface component 202, identifies prospective human respondents, distributes queries based upon the query information, collects responses from the human respondents, and stores the response information.

In one embodiment, the human interaction task system 204 prepares the query for distribution to human respondents. For example, the human interaction task system 204 may prepare the instructions, media, query language, and ratings language for presentation to the human respondent. The presentation may include ordering presentation of information.

Human respondent information and query information may be further employed by the human interaction task system 204 to identify potential human respondents. In one embodiment, the human interaction task system 204 may identify potential human respondents by matching query criteria with profile information for respective respondents. Matches may be identified for profile information that fall within the conditions of the query criteria. It may be understood that the query criteria may specify as few as one and as many query criteria as desired.

Should the human task interaction system 204 identify the desired minimum number of prospective respondents indicated in the query information, the human interaction task system 204 may provide the query to the human respondents. However, if the human interaction task system 204 fails to identify the desired minimum number of prospective respondents, the query criteria may be relaxed. In one embodiment, the lowest ranked query criteria may be removed and human task interaction system 204 may determine if the desired minimum number of prospective respondents is achieved. This process may be continued until the desired minimum number of prospective respondents is obtained.

Upon identifying the prospective respondents, the human interaction task system 204 may provide the query to the human respondents. In one embodiment, a query notification may be provided to the human respondent at their telephony device 116. The query notification may be delivered by a communication mechanism capable of being received by the telephony device 116. Examples may include, but are not limited to, telephone calls, SMS messages, electronic mail (e-mail messages), voice-over-IP calls, and video calls. The human respondent may review the query.

The query notification may include selected information pertinent to the query. In one embodiment, the query notification may include a brief synopsis of the subject of the query, an expected time for completion, and any relevant requirements, such as a deadline for completion of the query, confidentiality, and the like. The query notification may further include a mechanism for indicating whether the human respondent desires to accept the query, such as a return email address, a return phone number, and the like. The human respondent may ignore the query notification should they not be interested in participating in the query. However, should the human respondent be interested in participating in the query, an affirmative response may be required. Upon providing an affirmative response, additional instructions and/or the query itself may be provided to the human respondent at their telephony device 116. Queries may be provided by telephone calls, text and/or image data via SMS messages, voice-over-IP calls employing telephony devices, and other telephony mechanisms known in the art.

In certain embodiments, the manner in which a query is conducted for different human respondents may be varied based upon the query information. In one example, the query information may specify that respondents receive different query questions based upon their profile information. For example, within the same query, human respondents within a first age group may receive a first set of query questions while human respondents within a second age group may receive a second set of query questions. In another example, the query information may specify that the information presented to the human respondent is changed depending upon their telephony device. For example, a human respondent employing a telephony device 116 with video capabilities may receive additional information for consideration in a video format, while another human respondent employing a telephony device 116 without video capabilities may receive the same additional information for consideration in an audio only format.

After completion of the query questions, the human respondent may be provided with additional ratings questions. The ratings questions may be questions directed towards determining the quality of the human respondent's query experience. Examples of ratings questions may include, "Did the call take the amount of time you expected," "Were the questions clear," and "Was the topic of the questions of interest to you?" The human respondent may be asked to provide a rating in a classification scheme which enables a numerical rating to be applied to the query experience. The ratings may include any ratings systems understood in the art, such as star-rating systems, numerical rating systems, and the like. The human respondent may further provide free form answers as well. This ratings information may enable the telephony query system 102 to determine whether the query information submitted by the user was adequate.

Upon completion of the query questions and rating, the responses and ratings data generated by the human respondent may be stored by the telephony query service 102 (e.g., in data store 106) and provided to the user. The user may further rate the responses received by human respondents. For example, if a human respondent failed to respond to any questions, the user may provide a low rating to that human respondent. This human respondent rating information may be employed by the telephony query service 102 to maintain quality amongst the human respondents. For example, a human respondent consistently given low ratings may be given a warning, put on a probation period during which they are restricted from receiving new queries, or banned from future use of the telephony query service 102 altogether. If, however, a human respondent receives high ratings, such as ratings above average, the human respondent may qualify for rewards, such as cash rewards, gift cards, and other forms of compensation.

The telephony query service 102 may further include a customer service system 206. As discussed above, the telephony query service 102 may make customer service agents (CSAs) available for assisting human respondents in responding to query questions. In certain embodiments, the CSAs may be CSAs affiliated with the user. For example if a query question is unclear, the human respondent may press a selected key or key combination on their telephony device to indicate their desire to contact a CSA. Alternatively, a CSA may conduct the query in which the human respondent has agreed to participate.

Embodiments of systems and methods employed by the customer service system 206 for facilitating contacts between an individual, such as a human respondent, and CSAs are discussed in U.S. patent application Ser. No. 12/547,370, filed Aug. 25, 2009, entitled, "SYSTEMS AND METHODS FOR CUSTOMER CONTACT" and Ser. No. 12/547,387 filed Aug. 25, 2009 and entitled, "SYSTEMS AND METHODS FOR CUSTOMER CONTACT," which are hereby incorporated by reference in their entirety.

In brief, the user may provide the telephony query service 102 with contact information for CSAs of the user. This contact information may include, but is not limited to, phone numbers at which a CSA may be reached. Subsequently, a request to contact a CSA may be transmitted from the telephony device 116 to the customer service system 206. In certain embodiments, the customer service system 206 may identify whether a CSA is available and in turn establish contact between an available CSA (e.g., using the previously provided contact information for the CSA). In certain embodiments, a human respondent may be placed on hold until a CSA becomes available. In other embodiments, if a CSA is unavailable, or is not expected to become available for a selected duration of time, the customer service system 206 may further request contact information (e.g., a telephone number) from the human respondent so as to allow the CSA to contact the human respondent at a later date.

In further embodiments, the customer service system 206 may modify the number of available CSAs to approximately meet the number of human respondents requesting contact with CSAs. Beneficially, by dynamically allocating CSAs, the telephony query service 102, may facilitate high utilization of CSAs assigned to the telephony query service 102 and help to ensure that human respondents are provided prompt assistance when needed.

Embodiments of systems and methods for dynamic allocation of telephony resources employed by the customer service system 206, such as the type needed for a call center including CSAs, are discussed in U.S. patent application Ser. No. 12/624,375, filed Nov. 23, 2009, and entitled, "SYSTEMS AND METHODS FOR ALLOCATION OF TELEPHONY RESOURCES ON-DEMAND," which is hereby incorporated by reference in its entirety. The customer service system 206 may monitor the number of CSAs available to the telephony query service 102 and the number of human respondents communicating or waiting to communicate with a CSA. Should the number of human respondents waiting to communicate with a CSA and/or a time duration to communicate with a CSA exceed a first threshold value, the customer service system 206 may make additional CSAs available to the telephony query service 102. The number of CSAs made available to the telephony query service 102 may be sufficient to reduce at least one of the total number of human respondents waiting to communicate with CSAs and the time duration to communicate with CSAs below the first threshold value. In certain embodiments, the time duration may include, but is not limited to, an average wait time of all human respondents to speak to a CSA over a selected time period and a highest wait time for a human respondent to speak to a CSA.

Conversely, should the number of CSAs waiting to communicate with human respondents exceed a second threshold value, the customer service system 206 may reduce the number of CSAs assigned to the telephony query service 102. The number of CSAs available to the telephony query service 102 may be reduced to an amount sufficient to maintain at least one of the number of human respondents waiting to communicate with a CSA and the time duration to communicate with a CSA below the first threshold value.

Figure 3:
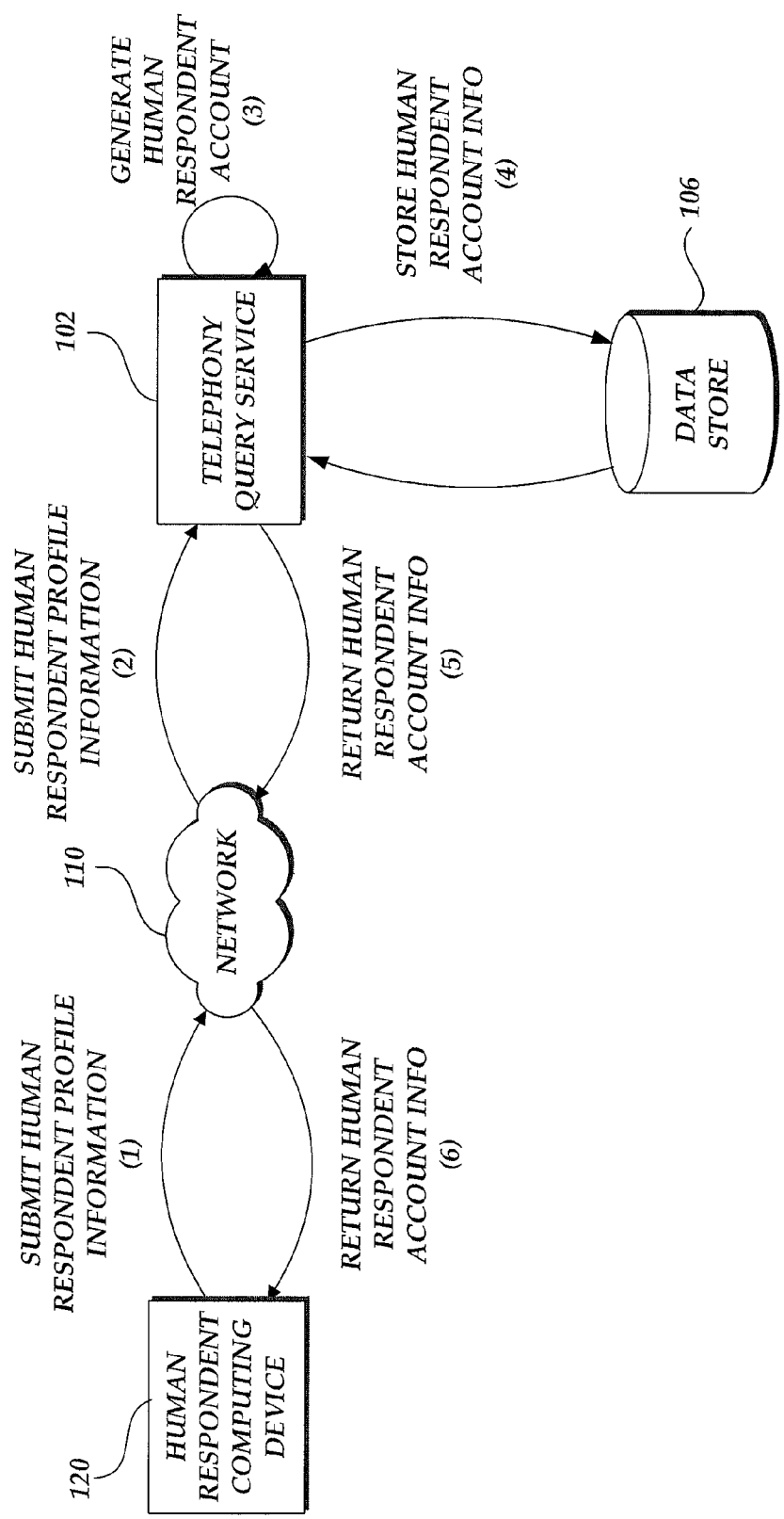
FIG. 3 is a schematic block diagram of a human respondent computing device submitting profile information to the telephony query service of FIG. 1 for registration of the human correspondent with the telephony query service.

FIG. 3 is a schematic block diagram of the human respondent computing device 120 submitting profile information to the telephony query service 102. The telephony query service 102 receives the profile information for the human respondent and generates an account for the human respondent. This account may be a record locator for storage of selected information regarding the human respondent within the telephony query service 102 (e.g., in the data store 106). Such information may include, but is not limited to, the human respondent profile, activity of the human respondent (e.g., queries accepted and rejected, returned responses, the human respondent rating), a generated account username and password for access to the telephony query service 102, and the like. Upon generating an account for the human respondent, the generated account username and password for access to the telephony query service 102 may be returned to the human respondent. Human respondents who have submitted profile information may be referred to as registered human respondents.

Figure 4:
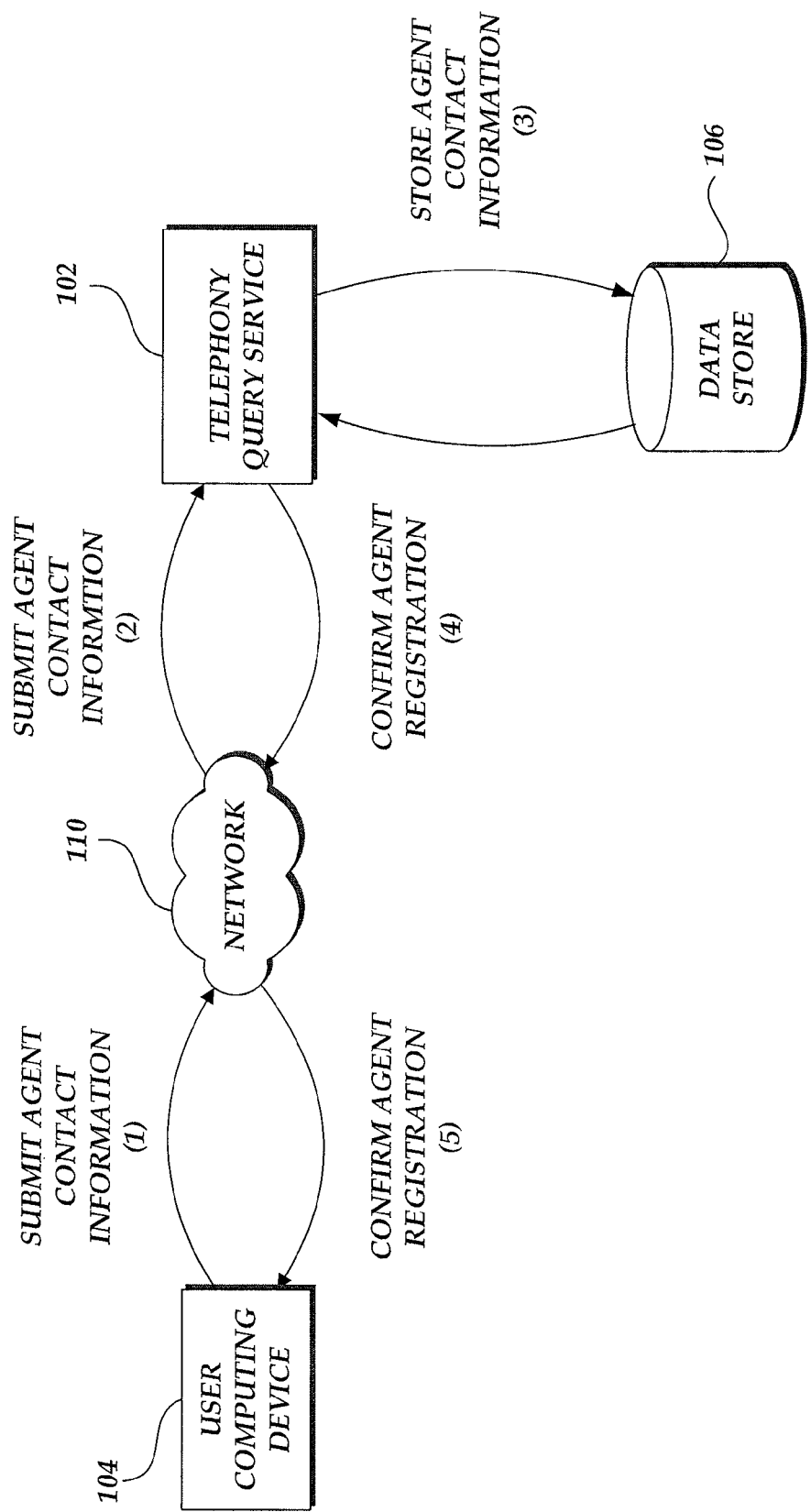
FIG. 4 is a schematic block diagram of a user computing device submitting customer service agent (CSA) contact information to the telephony query service of FIG. 1 for registration of the CSA with the telephony query service.

FIG. 4 is a schematic block diagram of the user computing device 120 submitting CSA contact information for the user to the telephony query service 102. The telephony query service 102 receives the contact information for the CSAs of the user and records the contact information in the data store 106. The CSA contact information may be accessed by the customer service system 206 whenever a CSA is to be placed in contact with a human respondent. Upon storing the CSA contact information, the telephony query service 102 may return a confirmation message to the user computing device 104 indicating successful receipt of the CSA contact information.

Figure 5A:
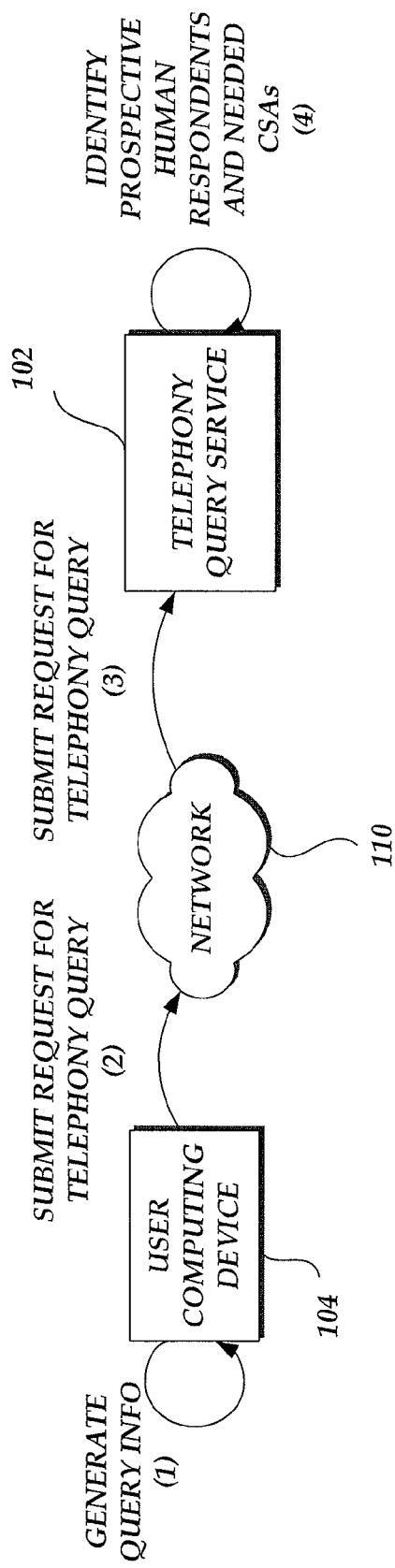
FIG. 5A is a schematic block diagram of the user computing device 120 submitting query information to the telephony query service 102 for obtaining human input regarding an item of interest to the user.

FIG. 5A is a schematic block diagram of the user computing device 120 submitting query information to the telephony query service 102 for generation of human input regarding an item of interest to the user. As discussed above, upon receipt of the query information, the telephony query service 102 compares the query criteria of the query information with the profile information of registered human respondents. Human respondents possessing the query criteria may be identified as prospective respondents. If the number of identified respondents is less than a threshold value (e.g., a minimum value specified in the query information), the query criteria may be relaxed in order to obtain at least the threshold value of prospective respondents.

The telephony query service 102 may further estimate the number of CSAs needed to support the prospective number of human respondents which will receive queries. The estimated number may be provided when the query is transmitted to the human respondents. In this manner, the telephony query service 102 may adequately support the human respondents receiving queries.

Figure 5B:
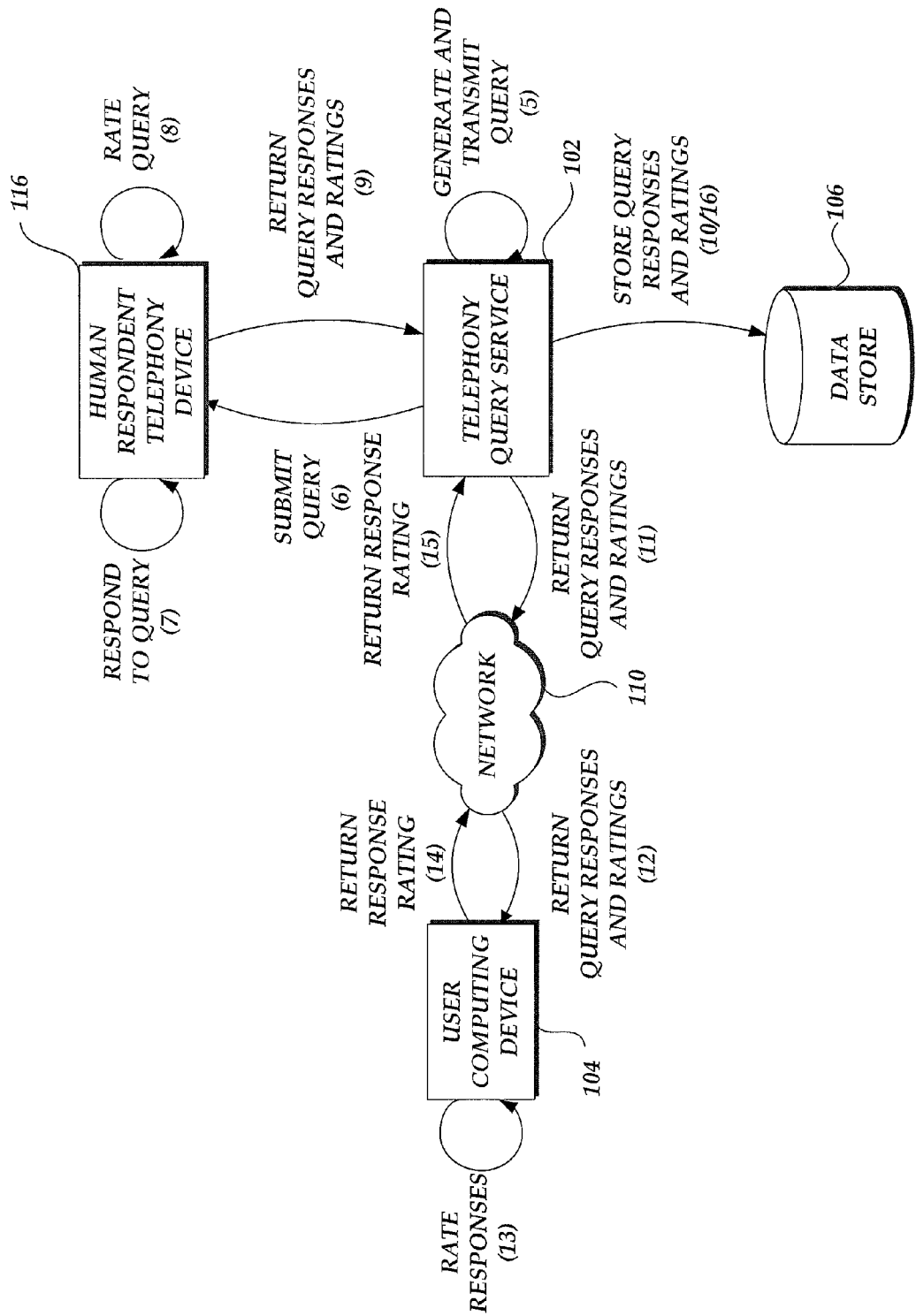
FIG. 5B is a schematic block diagram of the transmission of a generated query by the telephony query service to telephony devices of the human respondents and delivery of completed query responses to the user via a user computing device.

FIG. 5B is a schematic block diagram of query transmission by the telephony query service 102 to telephony devices 116 of the human respondents and delivery of completed query responses to the user via their user computing device. The telephony query service 102 may generate the query from the query information and transmit the query to the human respondents at the telephony device 116 and availability specified in the respective respondent's profile information. As discussed above, the telephony query service 102 may process the query information so as to identify the query questions within the query information. The telephony query service 102 may further prepare the query questions for presentation to the user within the query. Upon receipt of the query at their telephony device, the human respondent may respond to the query questions and rating questions and subsequently transmit the completed query questions and rating questions to the telephony query service 102, where they are stored in data store 106. The stored rating information may be employed at a later date by the telephony query service 102 for evaluating the user. For example, aspects of the user such as the quality of query information provided to the telephony query service 102, the interest which human respondents have for the query questions prepared by the user, and the like may be examined. This information may assist the telephony query service 102 in improving query information submissions received from the user.

The responses to the query questions may be further transmitted to the user computing device 104 for review and use by the user. The user may further rate the query responses for the human respondent. The rating generated by the user to the human respondent's responses may be further provided to the telephony query service 102. The stored human respondent rating information may be employed at a later date by the telephony query service 102 for evaluating the human respondent. For example, aspects of the human respondent such as the quality of responses, timeliness of submitted responses, and the like may be examined. On the basis of these ratings, the telephony query service 102 may reward or sanction the human respondent to encourage continued good submissions or improvements in poor submissions. For example, compensation may be provided to highly rated human respondents, while poorly rated human respondents may be restricted from participating in queries for a selected time period. In this manner, the telephony query service 102 may maintain and improve the quality of response submissions received from the user.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for obtaining human input related to items of interest to a user, the system comprising:
    a data store;
    a computing device comprising at least one hardware processor and in communication with the data store, the computing device operative to:
        receive a request to obtain human input regarding an item of interest based, at least in part, on query information obtained from the user, the query information including one or more questions regarding the item of interest and one or more query criteria, the one or more query criteria identifying one or more characteristics of a human respondent;
        identify a first plurality of human respondents by matching the one or more query criteria with human respondent profile information, the human respondent profile information comprising characteristics of individual human respondents;
        based on a determination that the number of human respondents identified in the first plurality of the human respondents does not satisfy a threshold, modify the one or more query criteria to increase the number of human respondents;
        identify a second plurality of the human respondents based, at least in part on, the modified one or more query criteria and the human respondent profile information, wherein the number of human respondents identified in the second plurality of human respondents satisfies the threshold;
        for individual human respondents of the second plurality of human respondents,
            transmit the one or more questions to a computing device associated with the selected human respondent; and
            receive one or more responses to the one or more questions generated by the selected human respondent.

2. The system of claim 1, wherein the one or more query criteria are ranked.

3. The system of claim 2, wherein modifying the one or more query criteria comprises removing the lowest ranked criteria.

4. The system of claim 1, wherein modifying the query criteria includes modifying the query criteria until the identified number or human respondents satisfies the threshold.

5. The system of claim 1, wherein the threshold is a minimum number of human respondents identified in the query criteria.

6. The system of claim 1, wherein the profile information for a human respondent comprises at least one of demographic information regarding the human respondent, availability of the respondent to receive query questions, interests of the human respondent, and information regarding one or more capabilities of the telephony devices of the human respondent.

7. A computer-implemented method for obtaining human input regarding an item of interest to a user, the method comprising:
    identifying, by a computing system, a first plurality of human respondents by matching user-defined query criteria with human respondent profile information, wherein the user-defined query criteria identifies one or more characteristics of individual human respondents;
    based on a determination that the number of human respondents identified in the first plurality of the human respondents does not satisfy a threshold, modifying, by the computing system, the user-defined criteria;
    identifying, by the computing system, a second plurality of the human respondents by matching the modified user-defined query criteria with human respondent profile information, wherein the number of human respondents identified in the second plurality of human respondents satisfies the threshold;
    for individual human respondents of the second plurality of human respondents, providing one or more questions regarding the item of interest to a computing device associated with the human respondent; and receiving at least one response to the one or more questions from the human respondent.

8. The method of claim 7, wherein the user-defined criteria is ranked.

9. The method of claim 8, wherein modifying the user-defined criteria comprises removing the lowest ranked criteria.

10. The method of claim 7, wherein the threshold is a minimum number of human respondents identified in the query criteria.

11. The method of claim 7, wherein modifying the query criteria includes modifying the query criteria until the identified number or human respondents satisfies the threshold.

12. The method of claim 7, wherein the human profile information for a human respondent comprises at least one of demographic information regarding the human respondent, availability of the respondent to receive query questions, interests of the human respondent, or information regarding one or more capabilities of the telephony devices of the human respondent.

13. The method of claim 7, wherein the item of interest comprises one or more of objects, events, people, places, audio, or video.

14. A non-transitory computer readable medium having a computer-executable component for enhancing and storing data related to an item of interest to a user, the computer-executable component comprising:

telephony query component operative to:
identify a first plurality of human respondents by based, at least in part on, identified correlations between user-defined query criteria and human respondent profile information;

based on a determination that the number of human respondents identified in the first plurality of the human respondents does not satisfy a threshold, modify the user-defined criteria to increase the number of human respondents; and identify a second plurality of the human respondents based, at least in part on, identified correlations between the modified user-defined query criteria and human respondent profile information, wherein the second plurality of human respondents satisfies the threshold.

15. The computer readable medium of claim 14, wherein the user-defined query criteria is ranked.

16. The computer readable medium of claim 14 wherein modifying the user-defined query criteria comprises removing the lowest ranked criteria.

17. The computer readable medium of claim 14, wherein the threshold is a minimum number of human respondents identified in the user-defined query criteria.

18. The computer readable medium of claim 14, wherein modifying the query criteria includes modifying the query criteria until the identified number or human respondents satisfies the threshold.

19. The computer readable medium of claim 14, wherein the profile information for a human respondent comprises at least one of demographic information regarding the human respondent, availability of the respondent to receive query questions, interests of the human respondent, or information regarding one or more capabilities of the telephony devices of the human respondent.

20. The computer readable medium of claim 14, wherein the item of interest comprises one or more of objects, events, people, places, audio, or video.

* * * * *